United States Patent Office 3,348,979
Patented Oct. 24, 1967

3,348,979
PROCESS FOR TREATING ALUMINUM WELD WIRE
James F. Murphy, Hamden, and Allan A. Dolomont, North Haven, Conn., assignors to Olin Mathieson Chemical Corporation, a corporation of Virginia
No Drawing. Filed Jan. 24, 1964, Ser. No. 339,874
8 Claims. (Cl. 148—6.2)

ABSTRACT OF THE DISCLOSURE

A process for producing aluminum weld wire which yields a nonporous weld bead through either a caustic etching bath or an electrocleaning operation in which the wire is the cathode in a first electrocleaning tank and is the anode in a second electrocleaning tank, passing the wire through an acid neutralizing bath, passing the wire through a coating bath containing either a soluble hexavalent chromium compound, a soluble fluoride, a soluble acidic substance and an acid stable complex anion, and finally heating the wire to a temperature of from about 150 to 500° F., with appropriate water rinses preferably after each of the mentioned steps except the last one.

---

This invention relates to improvements in processing of aluminum weld wire and more particularly to a method of treating such wire for continuously cleaning and applying a corrosion protective coating to the wire surface to achieve an aluminum welding wire which yields a high quality nonporous weld bead when used in welding components of aluminum articles.

This invention is related to the invention described in co-pending application, S.N. 339,853, filed Jan. 24, 1964. That application discloses a method of continuously electrocleaning aluminum welding wire for the purpose of achieving a product which is sufficiently clean and free of hydrogen containing contaminants normally present on the wire surface so that a weld bead made from the treated wire is substantially free of porosity.

The present invention is directed principally to an extension of that process as well as the inclusion of alternative pretreatment operations in combination with the novel process disclosed herein to produce a wire which achieves weld beads of substantially the same high quality as those obtained from wire processed in accordance with the disclosure of the co-pending application, and which has the added advantage of being more resistant to hydration and corrosion for longer periods of time.

As pointed out in detail in the aforementioned co-pending application, the presence of hydrogen caused porosity in the weld bead is a major deterrent factor to the increased use of aluminum in many fields. In those applications where welded articles are subjected to extremely high internal pressures, it is necessary that the weld bead be substantially if not completely free of porosity, which greatly reduces the strength of the weld. It has been determined that porosity in the weld bead is caused primarily by the inclusion of hydrogen carrying or containing material or contaminants on the surface of the wire used in metal inert gas aluminum welding; the hydrogen is the result of the formation of hydrous or hydrated corrosion products or hydration of the air formed oxide films on the wire surface.

Water in the corrosion product film on the aluminum wire enters with the wire into the welding arc, and is decomposed into hydrogen and oxygen. The hydrogen so formed is dissolved at the elevated temperatures into the molten aluminum, and upon solidification of the molten aluminum becomes evident as pores in the weld bead.

It was additionally pointed out in the aforementioned co-pending application that an additional source of hydrogen on the wire surface results from materials deposited on the wire surface as a part of the fabrication process. More specifically, during wire drawing, it is necessary to coat the wire with a variety of lubricants, both mineral base and vegetable base, the mineral base lubricants being petroleum products which, when the wire enters the annealing furnace, are subjected to cracking which results in a galvanically active carbon particle residue being left on the wire surface. During periods of subsequent storage in humid atmospheres, the galvanically active carbon particles, as well as heavy metal particles such as embedded steel, iron, copper or any other heavy metal particle that might have been put into the wire surface during manufacture, act as minute cathodic stimulators of corrosion and set up small galvanic cells which react with moisture to set up a corrosive process and coat the wire with an aluminum hydroxide film. Thus, it is apparent that an additional source of hydrogen is present in that when the wire is subjected to melting temperatures in the welding arc, the hydroxide or hydrous oxide film breaks down to liberate free hydrogen which is readily accepted into solution in the liquid metal, but which is promptly rejected when the metal freezes and forms bubbles thereby resulting in the objectionable weld bead porosity.

The attainment of a satisfactory welding wire capable of yielding porosity free welds is essentially a two-fold problem, one aspect thereof being to obtain a wire that is completely clean and free of any hydrogen containing materials or contaminants, the other aspect being to maintain the wire in this condition for extended periods of time sufficient to permit normal storage, transport, and handling from point of manufacture to point of use without rehydration or commencement of other corrosion producing processes. Among the prior art solutions which have met with only limited acceptance is caustic etching followed by elaborate packaging techniques, a process which resulted in a relatively clean and contaminant free wire but which offers limited protection to hydration. Various commercial degreasing solvents such as trichloroethylene remove petroleum type lubricants but have little or no effect upon the animal fat type lubricants. Therefore, additional solvents with corresponding additional processing steps must be utilized to achieve a sufficiently clean wire; such additional processing again renders the product commercially undesirable.

Accordingly, the present invention is directed toward the two-fold solution of providing a simple and efficient process for cleaning and degreasing the as drawn wire coupled with the application of a protective coating in a continuous and uninterrupted operation whereby both the disadvantages of prior art cleaning and the problems of storage in humid atmospheres for extended periods of time are alleviated or entirely eliminated.

It is therefore a principal object of the present invention to provide a method of continuously treating aluminum welding wires so that welds made therefrom will be substantially free of objective porosity.

It is another object of the present invention to provide a method of continuously treating aluminum welding wires which provides a wire sufficiently clean of porosity causing contaminants so as to produce an acceptable weld bead and which remains in this condition for extended periods of time.

It is still another object of the present invention to provide a method of continuously treating aluminum welding wires in which the as drawn wire is both degreased and rendered free of impurities which become cathodic stimulators of corrosion and hydrogen producing materials and which has immediately thereafter formed on the surface thereof a protective corrosion resistant coating which prevents corrosion and resists hydration for extended periods of time.

It is still a further object of the present invention to provide a method of continuously treating aluminum welding wires in which the wire is first subjected to an electrocleaning operation and immediately thereafter, and in a continuous operation, is subjected to a conversion coating operation to apply a highly anhydrous and hydration resistant coating to the wire surface.

These and other objects of the present invention will become apparent from a consideration of the following detailed description.

In its broader aspects, the objects of this invention are achieved by continuously passing a suitably coiled supply of aluminum welding wire through a series of chemical solution treatment baths consisting of immersing the wire in an alkaline cleaning bath to remove grease and other dirt products as well as cathodic stimulators of corrosion in the form of small galvanically active carbon particles, then passing the wire through a rinse solution, immediately thereafter passing the wire through a passivating and neutralizing bath and a second water rinse, then passing the wire through a conversion coating solution which forms a thin coating upon the surface of the clean wire, again passing the wire through a rinse solution to remove any excess coating solution, drying the wire and finally heating the coated wire to an elevated temperature.

The invention is directed toward the improvement in the quality of welds produced from a variety of aluminum alloy welding wires. Principal among the alloys suitable for welding wires are the aluminum-iron-silicon group containing from 99.30% to 99.99% aluminum, of which the 1000 and 1100 series of alloys are representative, the 2000 series group containing from 3% to 7% copper, 0.1% to 0.5% manganese, .05% to 0.5% titanium, and balance aluminum, the 4000 series group having from 3% to 14% silicon, either with or without 3% to 6% copper with the balance aluminum, and the 5000 series group containing from 2% to 7% magnesium with the balance aluminum. It is to be understood that each of these groups additionally contains impurities normal thereto.

In order to produce weld beads of the quality required in those applications which necessitate porosity free welds, the wire must be subjected to a cleaning treatment which effectively removes substantially all of the grease or lubricants involved in the wire drawing operation together with the cathodic stimulators of corrosion which may be embedded in the wire surface and they hydrated oxide film which may be present on the wire surface as the result of atmospheric exposure. This cleaning may be accomplished to an effective degree by caustic etching in a sodium hydroxide solution in the range of 1% to 40% hydroxide to remove from 0.001″ to 0.003″ from the wire. While this procedure is highly effective in producing an exceptionally clean wire, it suffers the disadvantages of being difficult to control with any degree of accuracy, and the high amount of metal removal in the sodium hydroxide results in a heavily pitted wire having a mottled and discolored surface appearance.

As a preferred alternative to caustic etching, the wire is initially subjected to an electrocleaning operation substantially as described in the aforementioned co-pending application. In accordance with that disclosure the as drawn and coiled wire is drawn through a first tank containing an aqueous alkaline solution having an anode strip inserted therein and is immediately thereafter drawn through a second tank having a similar aqueous alkaline solution containing a cathode strip whereby the wire is cathode in the first tank and anode in the second tank upon application of power. The wire is then immersed in a cold water rinse, passed through a passivating and neutralizing acid bath, and again rinsed in cold water.

As more fully detailed in the co-pending application, the alkaline solution is generally prepared from any one, or a combination of several, of the compounds selected from one of two groups, either the alkali metal hydroxides, such as sodium, potassium, lithium, rubidium, and cesium, as well as ammonium hydroxide; the other group consists of any alkali metal salt of a strong base and weak acid which hydrolyzes to an alkaline solution such as the carbonates, phosphates and phosphites including polyphosphates and polyphosphites, and cyanides. The solutions are usually maintained within the range of about 40° to 80° C. with an optimum at about 65°, and an anodic current density ranging between 25 and 1000 amps per sq. ft., preferably at about 950, at a potential of 7 to 20 volts is maintained at the cathode in a second tank. The wire is adjusted to travel at a speed which provides an approximate immersion time of 6 seconds although the process is operable over a range of 2 to 120 seconds.

Upon the application of power, a strong gas evolution takes place at the cathodic wire in the first tank which has a scrubbing action on the wire to assist in removal of all hydrogen containing contaminants. A mild etching action is also performed in the first tank. This etching action, together with the gas scrubbing, completely removes the drawing lubricants together with cathodic stimulators of corrosion hydrated oxide films and other harmful residues.

The wire then enters the second tank and is subjected to a mild electropolishing action therein due to the fact that the polarity is changed and the wire becomes the anode in the second tank. A thin oxide film is formed on the surface of the wire which affords a certain degree of protection against subsequent storage corrosion.

After rinsing the wire in cold water, the wire is then passed through a passivating and neutralizing acid bath to neutralize any residue or hydroxide solution which may still be adhering to the wire surface. Subsequent to the acid bath, the wire is again rinsed in cold water and is now ready for subsequent conversion coating processing.

Chemical conversion coatings which are generally used as paint bases and for corrosion protection vary in their ability to improve the performance of welding wire after high humidity storage. Certain types of conversion coatings cause the wire to deteriorate faster with respect to production of porosity free welds than untreated wire, while other coatings give considerable protection.

The more desirable conversion coatings are prepared from a combination of a soluble hexavalent chromium compound, a soluble fluoride, simple or complex, a soluble acidic substance including acids and acid salts, and an acid stable complex anion. Examples of the first group are any soluble chromates, dichromates or chromic acid; the fluoride usually consists of any of the alkali metal fluorides such as sodium, potassium, lithium, rubidium and cesium, or ammonium fluoride or corresponding fluoborates; the soluble acid or acid salt may consist of either nitric acid, sulfuric acid or acid sulfates of the alkali metals and ammonium ion; examples of the last group are alkali metal or ammonium ion ferricyanides or ferrocyanides or heteropoly acid anions which increase the rate of formation of the effective conversion coating and improve its corrosion resistance. The ferricyanides and ferrocyanides are salts of the alkali metals or ammonium.

Two conversion coating solutions which have been found to yield effective coatings are mixtures of some of the foregoing ingredients sold under the trade names "Alodine 1200" and "Iridite No. 14." A particularly preferred conversion coating solution is one consisting of one ounce of "Alodine 1200" per gallon of water, with nitric acid added until the pH is adjusted to 1.5. The solution is functional between pH of 1 and 2.

The chromating solutions are generally maintained at operating temperatures of between 70° and 100° F. Immersion times may vary from 3 seconds to 3 minutes, and good coatings can be applied by spraying, dipping, brushing or rolling with wire speeds in excess of 240" per minute.

Chromate coatings are generally extremely thin, in the order of 0.00002" or less, which corresponds to coatings having a weight of 5–150 mgs. per sq. ft. of surface. Preferably a light or medium thickness of coating is applied to the wire with a light coating requiring approximately 3 seconds immersion time and the medium coating approximately 5 seconds.

A major advantage to the use of chromate conversion coatings for extended protection against corrosion and hydration is the fact that the coatings are relatively good electrical conductors having a low electrical resistance. In this respect chromate conversion coatings are more desirable than a medium to heavy aluminum oxide film deposited by means of electropolishing which is dielectric and therefore must be exceedingly thin and uniform in order not to interfere with the welding process.

It has been found that dehydration of a conversion coating is relatively easy at elevated temperatures in the order of 150° to 50° F. with 250° F. preferred.

When conversion coated wires are dehydrated by this heating, they resist rehydration in highly humid atmospheres for extended periods of time. The reason for this characteristic is believed to lie in the fact that the coating films deposited by the chromate solutions are thought to contain mixed oxides of aluminum and chromium together with adsorbed and absorbed chromates. Heating of such films apparently reduces the solubility of the hexavalent chromium compounds (chromate) to produce an insoluble form. The coated wire is generally maintained at the elevated temperature for approximately 2 min. to 5 hours, preferably for about 2 hours.

Aluminum welding wires treated in accordance with the foregoing method and subsequently exposed to atmospheres of 98% relative humidity at 100° F. for as long as 30 days have been found to produce superior quality weld beads which are essentially free of porosity.

The following are examples of the practice of this invention and are to be considered as illustrative thereof and not all inclusive.

*Example I*

A sample of aluminum welding wire made from alloy 5356 was cleaned by means of caustic etching in an aqueous solution of 15% sodium hydroxide to remove between 0.001" and 0.002" from the 1/16" diameter wire. The wire was then rinsed in cold water and subjected to a passivating and neutralizing nitric acid solution followed by another cold water rinse. The wire was then drawn through a chromating solution containing one ounce per gallon of water of a mixture consisting of 50% chromic acid, 25% sodium fluoborate and 25% potassium ferricyanide, with nitric acid added to adjust the pH to 1.5. After rinsing in cold water and dried by hot air blast, the wire with its film was exposed to a furnace atmosphere at 250° F. for 2 hours. The wire was found to produce substantially porosity free weld beads after storage in an atmosphere of 100° F. and 98% relative humidity for one month.

*Example II*

A similar sample of wire was treated in the manner described above in Example I except that the chromating solution contained one ounce per gallon of water of a mixture containing 60% chromic acid, 20% sodium fluoride and 20% potassium ferricyanide, with nitric acid added to adjust the pH to 1.5. Similar results were obtained.

It will be apparent from the foregoing description that there has been provided a method of treating aluminum welding wire which is believed to provide a solution to the foregoing problems and achieve the aforementioned objects. It is to be understood that the invention is not limited to the examples described herein which are deemed to be merely illustrative to the best modes of carrying out the invention, but rather is intended to encompass all such modifications as are within the spirit and scope of the invention as set forth in the appended claims.

What we claim and desire to secure by Letters Patent is:
1. A process for treating aluminum weld wire comprising:
   (A) passing said wire through a first tank containing an aqueous alkaline solution in which the wire is the cathode in an electrolytic cell and then passing said wire through a second tank containing an aqueous alkaline solution in which said wire is the anode in an electrolytic cell,
   (B) rinsing said wire,
   (C) passing said wire through an acid neutralizing bath,
   (D) rinsing said wire,
   (E) continuously passing said wire through an aqueous coating solution having a pH from approximately 1 to 7 consisting essentially of a pH regulator and a substance selected from the group consisting of soluble hexavalent chromium compounds, soluble fluoride compounds, soluble acidic substances, and acid stable complex anions for a time sufficient for formation on the wire surface of a coating of at least 5 milligrams per square foot of surface,
   (F) rinsing said wire, and
   (G) heating said wire to a temperature of about 150 to 500° F. for a period of time from about 2 minutes to 5 hours.

2. A process according to claim 1 in which the alkaline solutions in step A are selected from the group consisting of alkaline metal hydroxides, alkaline metal salts of a strong base and a weak acid which hydrolyze to an alkaline solution, and ammonium hydroxide.

3. A process according to claim 1 in which after the rinsing in step F, the wire is dried prior to carrying out the heating specified in step G.

4. The method as set forth in claim 1 wherein said soluble hexavalent chromium compound is selected from the group consisting of soluble chromates, soluble dichromates and chromic acid.

5. The method as set forth in claim 1 wherein said soluble fluoride is a compound selected from the group consisting of alkali metal fluorides, alkali metal fluoborates, ammonium fluoride, and ammonium fluoborate.

6. The method as set forth in claim 1 wherein said soluble acidic substance is selected from the group consisting of nitric acid, sulfuric acid, acid sulfates of the alkali metals, and ammonium sulfate.

7. The method as set forth in claim 1 wherein said acid stable complex anion is a compound selected from the group consisting of alkali metal ferricyanides, alkali metal ferrocyanides, ammonium ferricyanide, ammonium ferrocyanide, and heteropoly acid anions.

8. The method as set forth in claim 1 wherein said temperature is within the range of 200° to 300° F.

References Cited

UNITED STATES PATENTS

| | | | |
|---|---|---|---|
| 1,515,658 | 11/1924 | Cole | 204—141 X |
| 2,325,957 | 8/1943 | Krogel | 204—141 |
| 2,681,402 | 6/1954 | Muller | 117—202 X |
| 2,796,370 | 6/1957 | Ostander et al. | 148—6.27 X |
| 2,911,332 | 11/1959 | Schuster et al. | 148—6.2 |
| 3,075,894 | 1/1963 | Ricks | 204—141 X |

ALFRED L. LEAVITT, *Primary Examiner.*

RALPH S. KENDALL, *Examiner.*

UNITED STATES PATENT OFFICE
CERTIFICATE OF CORRECTION

Patent No. 3,348,979            October 24, 1967

James F. Murphy et al.

It is hereby certified that error appears in the above numbered patent requiring correction and that the said Letters Patent should read as corrected below.

Column 5, line 22, for "50° F." read -- 500° F. --.

Signed and sealed this 5th day of November 1968.

(SEAL)
Attest:

Edward M. Fletcher, Jr.            EDWARD J. BRENNER
Attesting Officer            Commissioner of Patents